US005574798A

United States Patent [19]
Greer et al.

[11] Patent Number: 5,574,798
[45] Date of Patent: Nov. 12, 1996

[54] VISUAL PRESENTATION SYSTEM WHICH DETERMINES LENGTH OF TIME TO PRESENT EACH SLIDE OR TRANSPARENCY

[75] Inventors: Timothy D. Greer, Endicott; William F. Phillips, Owego, both of N.Y.

[73] Assignee: International Business Machines Corporation, Armonk, N.Y.

[21] Appl. No.: 285,390

[22] Filed: Aug. 3, 1994

[51] Int. Cl.⁶ .................................................. G06K 9/00
[52] U.S. Cl. ........................ 382/100; 382/168; 382/286
[58] Field of Search .................................. 382/100, 168, 382/177, 181, 232, 239, 246, 286, 317; 395/118, 162; 345/10, 112; 368/1, 10, 223; 353/122

[56] References Cited

U.S. PATENT DOCUMENTS

| | | | |
|---|---|---|---|
| 3,899,662 | 8/1975 | Kreeger et al. | 235/151 |
| 4,420,234 | 12/1983 | Dolejsi et al. | 353/122 |
| 4,631,521 | 12/1986 | El-Sherbini | 340/347 DD |
| 4,780,761 | 10/1988 | Daly et al. | 358/133 |
| 4,791,598 | 12/1988 | Liou et al. | 364/725 |
| 4,905,094 | 2/1990 | Pocock et al. | 358/342 |
| 4,928,253 | 5/1990 | Yamauchi et al. | 364/521 |
| 5,018,082 | 5/1991 | Obata et al. | 364/521 |
| 5,029,112 | 7/1991 | Sakamoto et al. | 364/521 |
| 5,081,449 | 1/1992 | Kurosu et al. | 340/721 |
| 5,101,197 | 3/1992 | Hix et al. | 340/784 |
| 5,214,758 | 5/1993 | Ohba et al. | 395/164 |
| 5,237,627 | 8/1993 | Johnson et al. | 382/30 |
| 5,262,765 | 11/1993 | Tsumura et al. | 345/122 |
| 5,265,180 | 11/1993 | Golin | 382/56 |
| 5,303,311 | 4/1994 | Epting et al. | 382/10 |
| 5,339,368 | 8/1994 | Higgins-Luthman et al. | 382/56 |

FOREIGN PATENT DOCUMENTS 4-324494  11/1992  Japan ........................... G09G 5/00

OTHER PUBLICATIONS

"Computer Science", Dec. 1993 (RJ 9639 (84079) Comparison Of International Standards For Lossless Still Image Compression, by Arps et al., pp. 1–11.

English Translation of Japanese Kokai 4–324494, Murakami et al., Nov. 1992.

Primary Examiner—Leo Boudreau
Assistant Examiner—Andrew W. Johns
Attorney, Agent, or Firm—Arthur J. Samodovitz

[57] ABSTRACT

A system determines display durations of each of a plurality of images in a presentation based on a respective amount of the information content in the image, the greater the information content the longer the display time. There are various techniques for determining the information content of each of the images. For example, the system determines for each image the number of pixels at each of a multiplicity of respective pixel levels and the total number of pixels at one or more pixel levels for which the respective number(s) of pixels are significantly larger than the numbers of pixels at the other pixel levels. The pixels represented by these one or more pixel levels likely represent background or other mundane information. Consequently, only the pixels at the other values are considered as containing important information and their total number represents the total information content of the image. Another technique is to count the number of alphanumeric characters in an alphanumeric image as a measure of the information content in the image. A third technique is to digitially compress the image and compare the size of the compressed image to the size of the uncompressed image as a measure of the information content.

14 Claims, 13 Drawing Sheets

```
FIND:
  WMAX = MAXIMUM OF W(1), W(2), ... ,W(N)
  WMIN = MINIMUM OF W(1), W(2), ... ,W(N)
  WTOT = W(1) + W(2) + W(3) + ... + W(N)
```
-220

K = 1     -222

← STEP 244

$$DTIME(K) = \frac{W(K)}{WTOT} * TIME$$
-226

STEP 230

FIG. 4A

VISUAL PRESENTATION SYSTEM WHICH DETERMINES LENGTH OF TIME TO PRESENT EACH SLIDE OR TRANSPARENCY

BACKGROUND OF THE INVENTION

The invention relates generally to visual presentation systems, and deals more particularly with a technique for determining how long to present each visual slide or transparency.

For many types of presentations, it is desirable to employ visual aids. The visual aids may take the form of slides, images generated on a video display monitor, images generated by a video projector or transparencies which are displayed with an overhead projector. There are several previously known systems for controlling the visual presentations. A well known slide carousel can be filled with slides, individually displayed on a screen with a projector, and advanced or regressed at any time with a manual switch. The operator determines how long to present; each slide. IBM Storyboard and AVC programs are used to define a list and sequence of video images and then display them. The Storyboard and AVC programs can automatically advance from image to image in the sequence according to display durations written in the program or can wait for a manual cue from the operator to advance. In the former case, the user defines the display duration for each image before presentation begins.

In the foregoing prior art, at some time a user determines how long to display each image. However, in many applications it is desirable to scientifically determine how long each image should be displayed.

Accordingly, a general object of the present invention is to provide a system which determines an optimum duration for displaying each of a multiplicity of images in a visual presentation.

SUMMARY

The invention resides in a method and system for determining display durations of each of a plurality of images in a presentation. First, the system determines an information content of each of the images. Then, the system determines, for each of the images, a display duration based on a respective amount of the information content in the image, the greater the information content the longer the display time.

There are various techniques for determining the information content of each of the images. For example, the system determines for each image the number of pixels at each of a multiplicity of respective pixel levels and the total number of pixels at one or more pixel levels for which the respective number(s) of pixels are significantly larger than the numbers of pixels at the other pixel levels. The pixels represented by these one or more pixel levels likely represent background or other mundane information. Consequently, only the pixels at the other values are considered as containing important information and their total number represents the total information content of the image.

Another technique is to count the number of alphanumeric characters in an alphanumeric image as a measure of the information content in the image. A third technique is to digitally compress the image and compare the size of the compressed image to the size of the uncompressed image as a measure of the information content.

According to other features of the invention, the system enforces a minimum and maximum limit for the display duration of each of the images, and adjusts the display durations of the images to obtain a user-selected total display time for all the images.

DETAILED DESCRIPTION OF THE PREFERRED EMBODIMENTS

Figure 1:
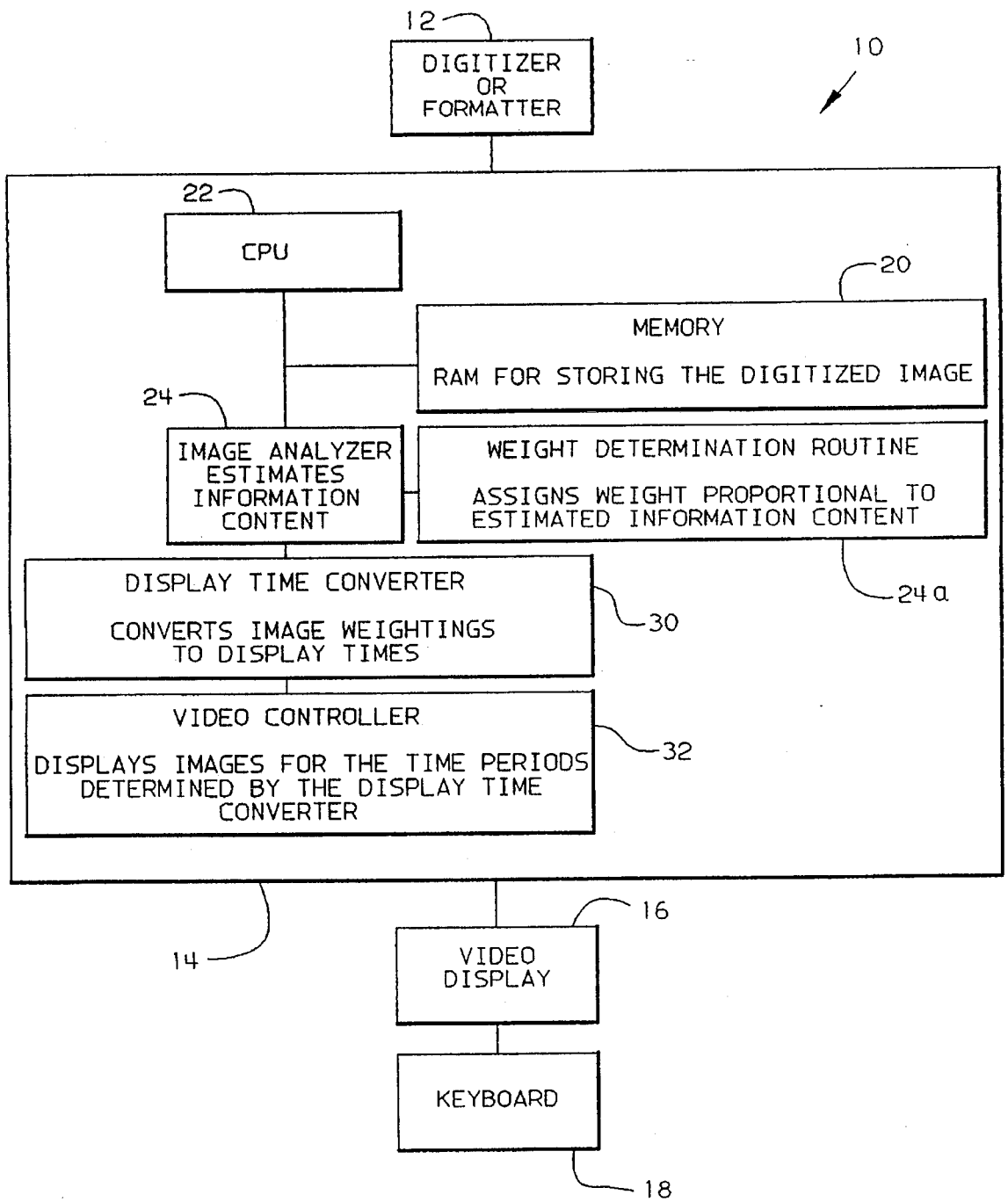
FIG. 1 is a block diagram of a computer system according to the present invention.

Referring now to the Figures in detail wherein like reference numbers indicate like elements throughout the several views, FIG. 1 illustrates a video presentation system generally designated 10 which determines durations that respective images in a visual presentation should be displayed. System 10 comprises an image digitizer 12, a programmed computer 14, a video display monitor 16 and a keyboard 18. The image digitizer may comprise an optical scanner for digitizing an existing image, a drawing program such as CorelDRAW which digitizes an image stored in a memory, or images created by a slide show generation program such as Storyboard. The resultant digitized image is in the form of a 2-dimensional array of pixels, each pixel represented by specific bits within a binary data file. The digitized images are stored on a magnetic disk or optical CD ROM and loaded into the computer 14. The computer 14 includes a random access memory 20 which then stores the digitized images in an order for analysis by CPU 22. CPU 22 is programmed by an image analyzer program 24 to determine the amount of information in each of the images. The result is passed to a display time converter program 30 to determine the length of time that each image should be displayed based on the amount of information in the respective image. The greater the information content, the longer the image is displayed. A video controller 32 fetches each of the digitized images from RAM 20 and controls their display on monitor 16 according to the display durations determined by the display time converter 30. By way of example, the video controller comprises a program used to display images on the video display. The video controller uses a list of images and respective display times as input, the display time for each image being supplied as an input parameter.

Figure 2:
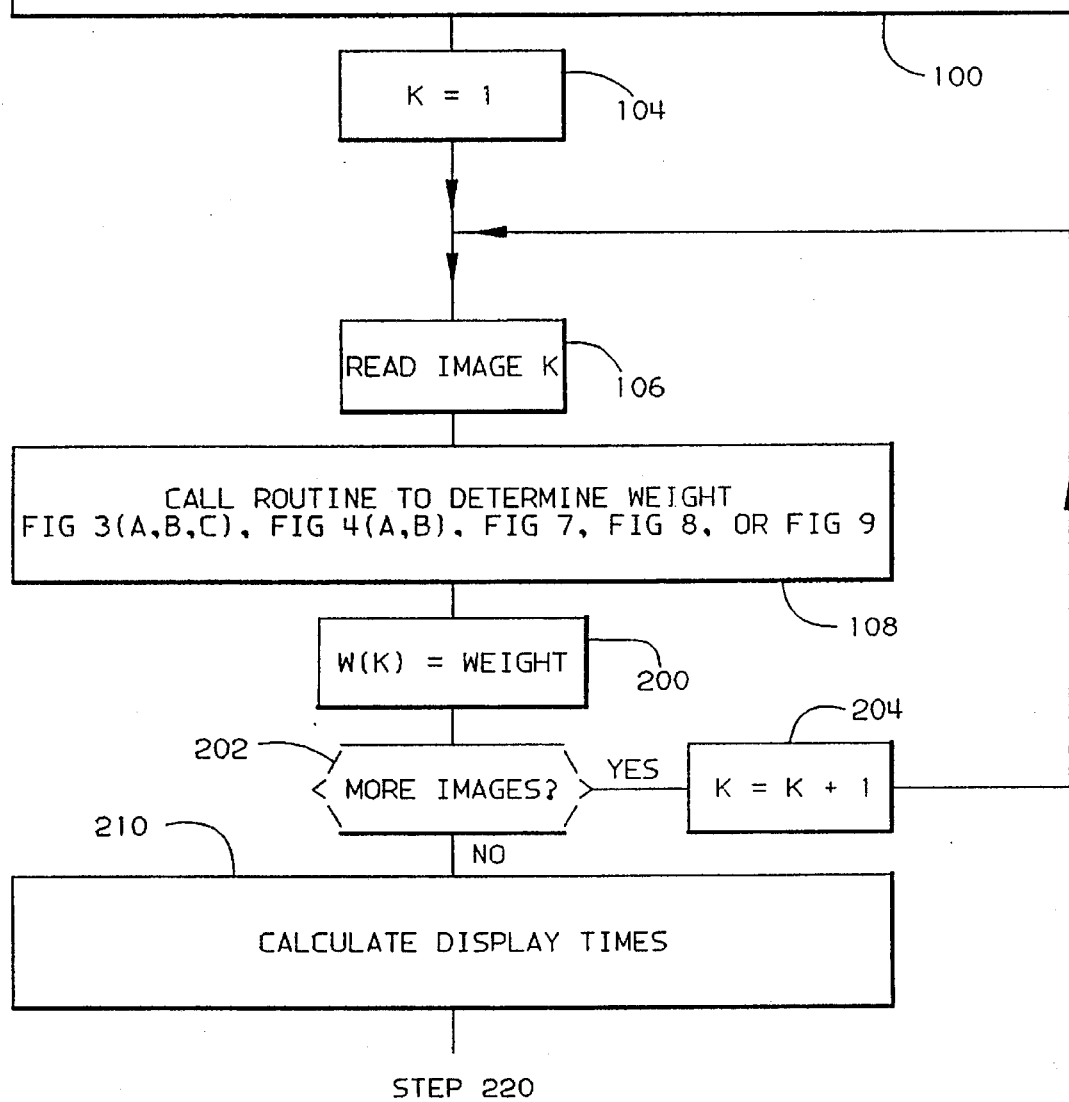
FIG. 2 is a flow chart of an image analyzer program shell within the computer system of FIG. 1.

FIG. 2 illustrates the beginning of the image analyzer program 24 in more detail. In step 100, the display time converter program asks the user to input values (via the keyboard) for the following parameters affecting the determination of the presentation duration for each image:

TIME—a desired total presentation time for all images combined.

ERROR—maximum acceptable difference between specified presentation time "TIME" and actual total presentation time.

MINDISP—a minimum display time for any single image.

MAXDISP—a maximum display time for any single image.

MINACC—As described below, a histogram is formed with each "bar" representing the number of pixels at a respective pixel value. The height of each bar represents the number of pixels exhibiting the respective pixel value. The "bars" are arranged in descending order of count number. MINACC is the minimum difference in count between successive "bars" deemed sufficient to separate the mundane/background information from the important information. In effect,, differences less than MINACC are deemed statistically insignificant.

SEARCHLEN—number of pixel values to examine when seeking to identify the mundane, background information. SEARCHLEN is typically 5% of the total number of pixel values.

N—total number of images in the presentation.

Next, program 24 initializes an image parameter K to one to indicate the first image in the presentation (step 104). Then program 24 reads the image indicated by the image parameter K, at this time the first image (step 106). Next, program 24 calls the weight determination program 24a to estimate the information content of the image (step 108). According to the present invention, there are different embodiments of the weight determination program which determine the information content in different ways.

Figure 3A:
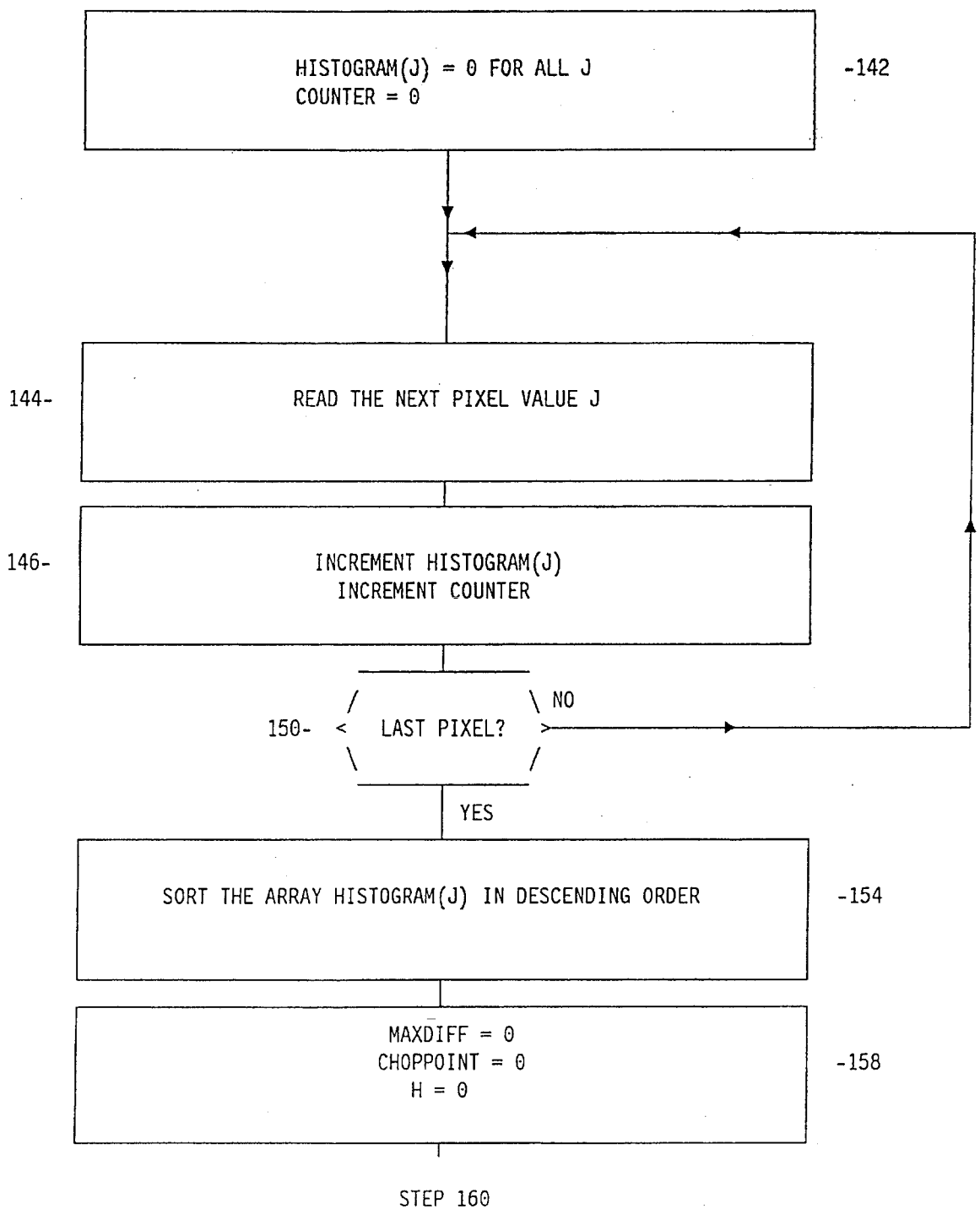
FIGS. 3($a,b,c$) form a flow chart of one embodiment of a specific image analyzer program within the image analyzer program shell of FIG. 2.
Figure 3:
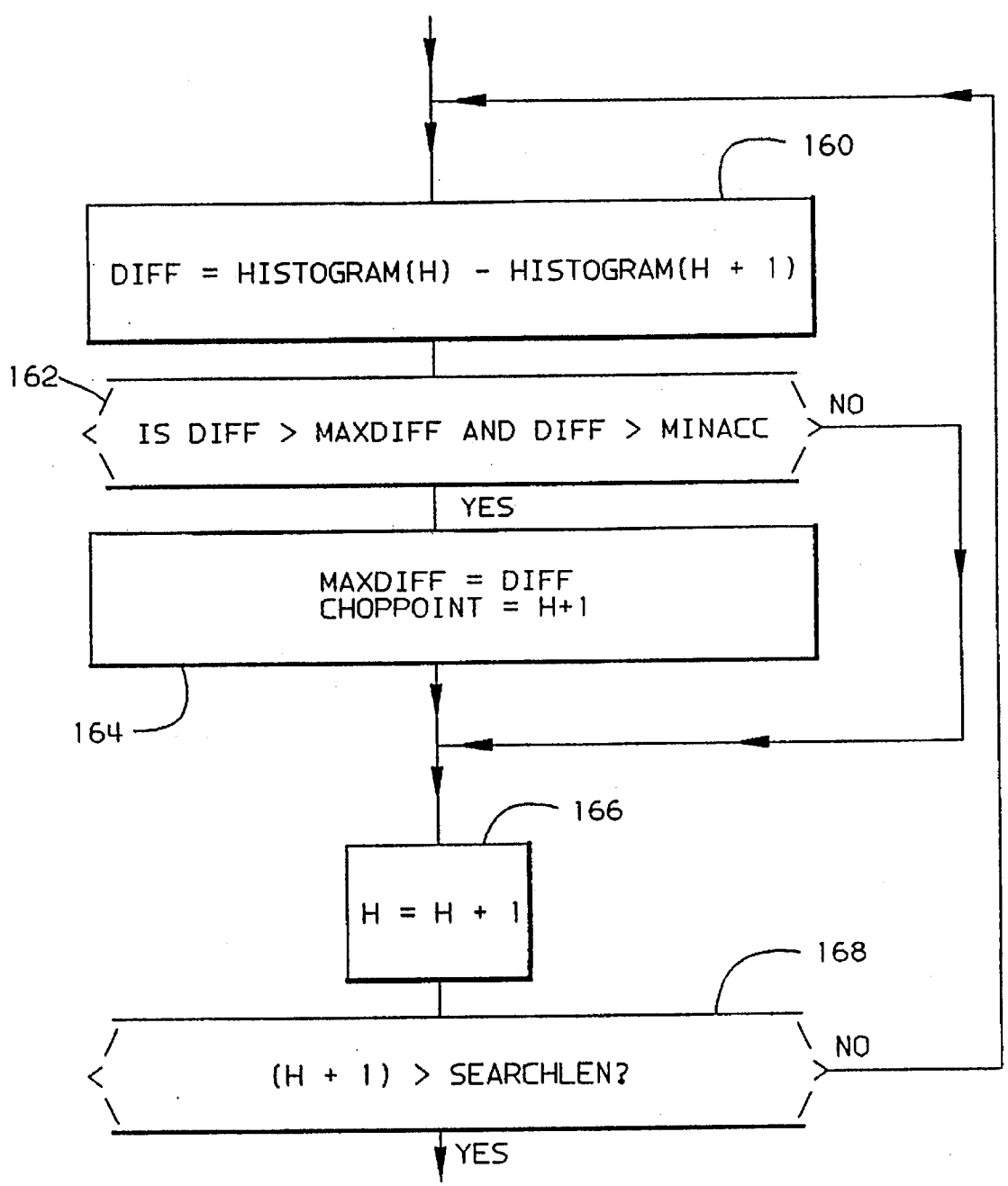

FIG. 3(a–c) illustrates in detail one embodiment of the weight determination program 24a, called a "histogram analyzer" routine. In general terms, the histogram routine determines the amount of information in an image based on a constant value minus the number of frequently occurring pixel values. These frequently occurring pixel values are presumed to represent mundane objects such as background level in a text or graphics image or sky in a pictorial image and therefore include little important information. The histogram counts the number of pixels at each pixel value and the final counts at the different pixel values represent "bars" of the histogram. The pixel "value" is the gray level in the case of a black and white image or a color or intensity level in the case of a color image.

First, the histogram routine initializes a parameter "J" representing each pixel in a current image and sets a counter equal to zero (step 142). Next, the histogram routine reads the value of the first pixel in the current image (step 144) and increments a "J" field corresponding to the pixel value (step 146). There is one "J" field for each possible pixel value and each "J" field represents a "bar" in the histogram. Next, the histogram routine determines if this is the last pixel in the image (decision 150). (Each image has a predetermined number of pixels.) Steps 144, 146 and 150 are repeated in a loop until the values of all pixels in the image are noted in the corresponding "J" field. Next, the histogram routine sorts the "J" fields based on final counts, and links them in descending order of the respective counts, i.e. the number of pixels at each pixel value (step 154). For example, if there are more pixels having a particular pixel value X than any other single pixel value, then the "J" field representing pixel value X is first after the sort is completed and the count of this "J" field becomes the "height" of the "bar" for pixel value X. If another pixel value Y represents the second highest number of pixels, then this pixel value Y is second after the sort is completed and the count value at pixel value Y becomes the height of the "bar" for the pixel value Y.

Next, the histogram routine initializes a maximum difference variable—MAXDIFF, a chopping point variable—CHOPPOINT, and count value H (step 158). Next, the histogram routine determines the difference in final count values between the first and second "bars" in the ordered histogram, i.e. between "bar" H and "bar" H+1 (where H equals zero during this iteration) (step 160). Next, the histogram routine determines if the difference is greater than the maximum difference parameter which at this time equals zero and also greater than the minimum significant parameter—MINACC (step 162). MINACC was specified in step 100 and is the minimum difference between two successive "bars" in the ordered histogram large enough to be considered as separating the preceding mundane pixels from the succeeding information pixels. If both conditions are true, then the histogram routine sets the maximum difference parameter—MAXXDIFF equal to the difference determined in step 160 and the chopping point equal to one. This indicates that the first bar represents mundane/background information. Or, if the conditions of decision 162 were not satisfied, the histogram routine increments the parameter H to equal one (step 166) and loops back to step 160 (assuming that the preceding "bar" was not the last in the histogram) (step 168). Steps 160–164 are now repeated for the second and third "bars" in the histogram. If the difference computed between the counts of the second and third "bars" is greater than the minimum significant difference—MINACC and greater than the current value of MAXDIFF, i.e. zero or the difference between the first and second "bars" if greater than MINACC, then the MAXDIFF variable is updated with the difference between the counts of the second and third "bars" and the CHOPPOINT variable is updated with H=2 (because H=1 at this point). This indicates that the first and second "bars" represent mundane/background information. Steps 160–164 are then repeated for successive pairs of "bars" in order until all the "bars" in the SEARCHLEN have been considered. The final effect of the iterations of steps 160–164 is to determine the "bar" location where the greatest decrease has occurred in count value from the preceding "bar". Assuming, the decrease is greater than MINACC, this data is stored as the final chopping point.

Next, the histogram routine initializes a weight variable equal to one and reinitializes the "bar" variable H equal to zero (step 180). Next, the histogram routine determines if the chopping point parameter is greater than the current value of H, in which case, the current "bar" lies before the chopping point (step 182). Assuming this is the case for the first "bar", the histogram routine decreases the weight parameter by the ratio of the count for the first "bar" to the total number of pixels in the image (which was previously known) (step 184). This has the effect of reducing the weight parameter by the amount of mundane or uninteresting information in the image represented by the first "bar". Steps 182 and 184 are repeated for all other "bars" ordered before the chopping point with the result that the final weight parameter for the image is reduced by the total amount of mundane or uninteresting information in the image.

Figure 3C:
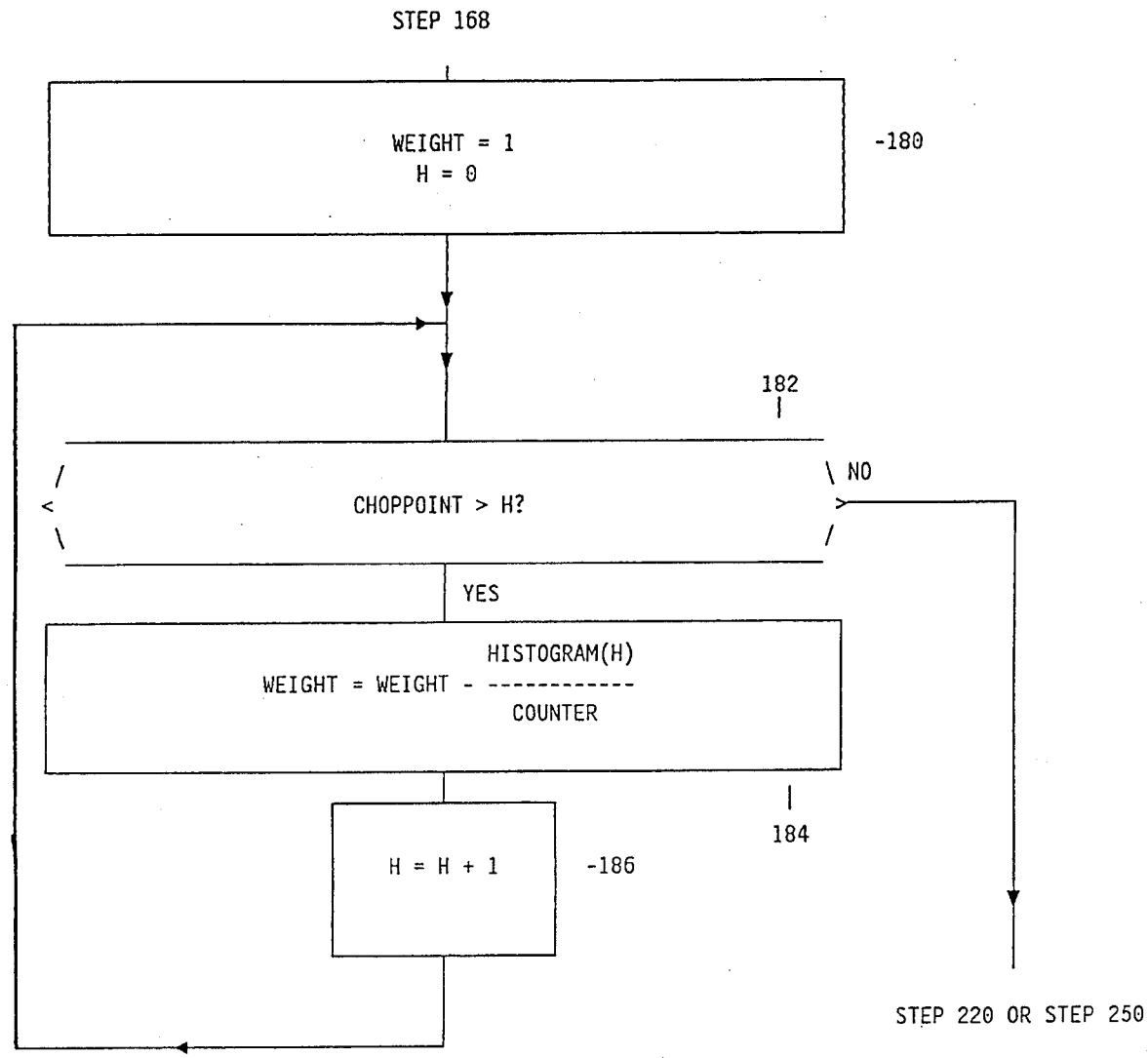

After completing the last iteration of steps 184 and 182, the histogram routine returns to step 200 of the display time converter program of FIG. 2. In step 200, the histogram routine stores a weight value W(K) for the current image equal to the value of the final weight variable of step 184 FIG. 3(c). Then, the display time converter program determines if there are any more stored images to be analyzed (decision 202), and if so, increments the image parameter K and begins another iteration of steps 106, 108 and 200 (step 204). After the final weight values for all of the images are determined, the display time converter program 30 determines the display duration for each image (step 210). As described in more detail below, this is based on the weight value of each image compared to the total weight values of all the images in the video presentation, although minimum and maximum display duration limits may be enforced.

Figure 4B:
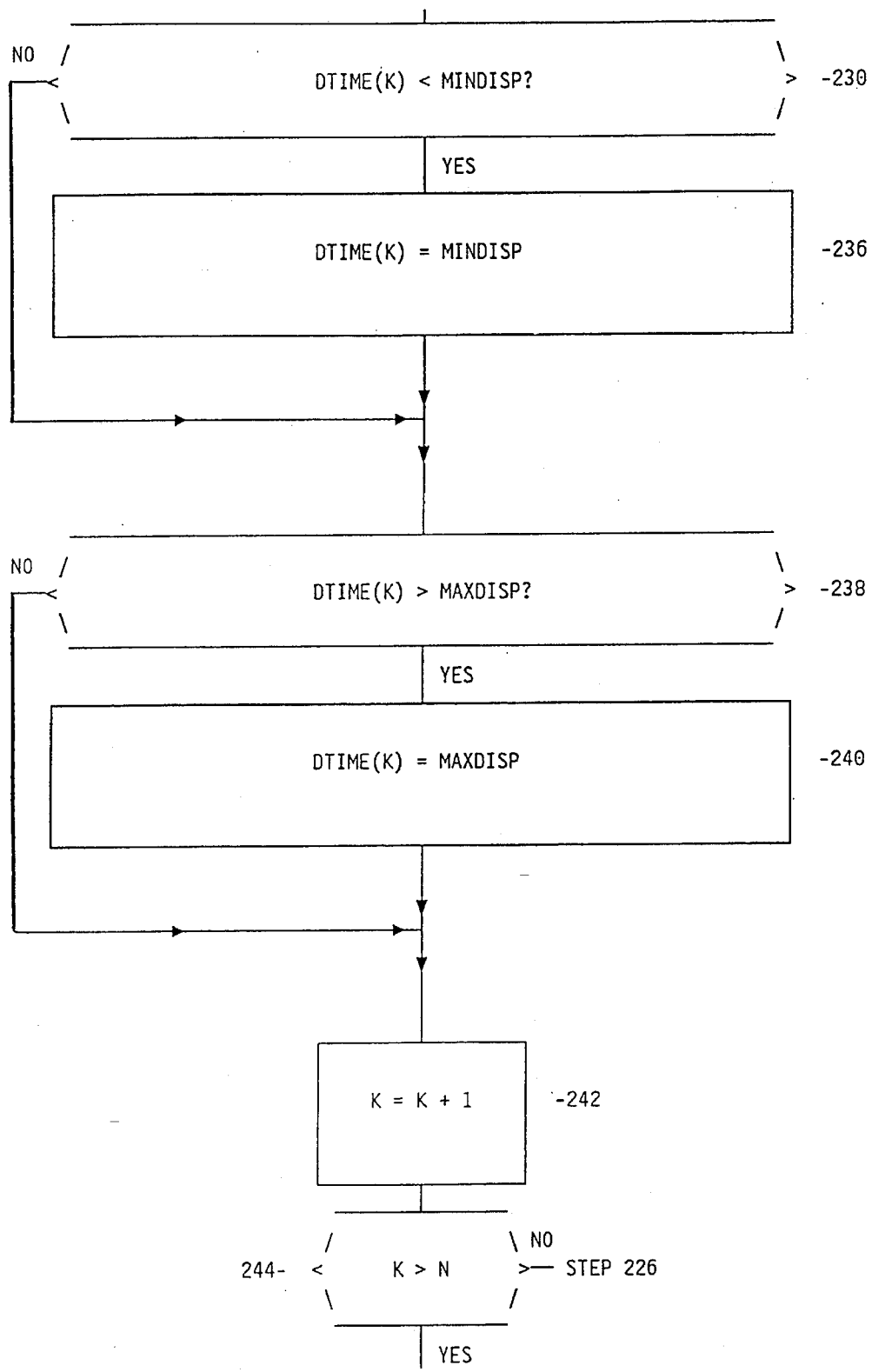
FIGS. 4($a,b$) form a flow chart of one embodiment of an initial portion of a display time converter program within the computer system of FIG. 1.

Step 210 of FIG. 2 is illustrated in more detail beginning with step 220 of FIG. 4(a) in cases where the user elects to use clipping to enforce the minimum and maximum display duration limits specified in step 100. In step 220 of FIG. 4(a), the display time converter program 30 determines the maximum and minimum weights of the images and the total of the weights of all images. Next, the converter program re-initializes the image variable K to one (step 222) and determines the display time for the first image as the weight of the first image times the total display time for all images specified by the user divided by the weight of all images (step 226). Next, the converter program determines if the display time determined in step 226 is less than the user specified minimum—MINDISP (step 230). If so, then the converter program sets the display time equal to the specified minimum (step 236). Next, or if the display time determined in step 226 was not less than the specified minimum, the converter program proceeds to step 238 to determine if the display time determined in step 226 is greater than the maximum specified display time—MAXDISP. If so, the converter program sets the display time equal to the specified maximum (step 240). Next, or if the display time determined in step 226 is not greater than the maximum, the converter program proceeds to step 242 to increment the image parameter K. If this is not the last image (decision 244), the converter program loops back to step 226 to determine the display time of the second image in the manner described above. Then, the converter program repeats steps 230–242 to enforce the minimum and maximum display time limits for the second image. Steps 226 and 230–242 are repeated for all other images, and then the histogram routine jumps to step 302 of FIG. 6(a) as describe below.

Figure 5:
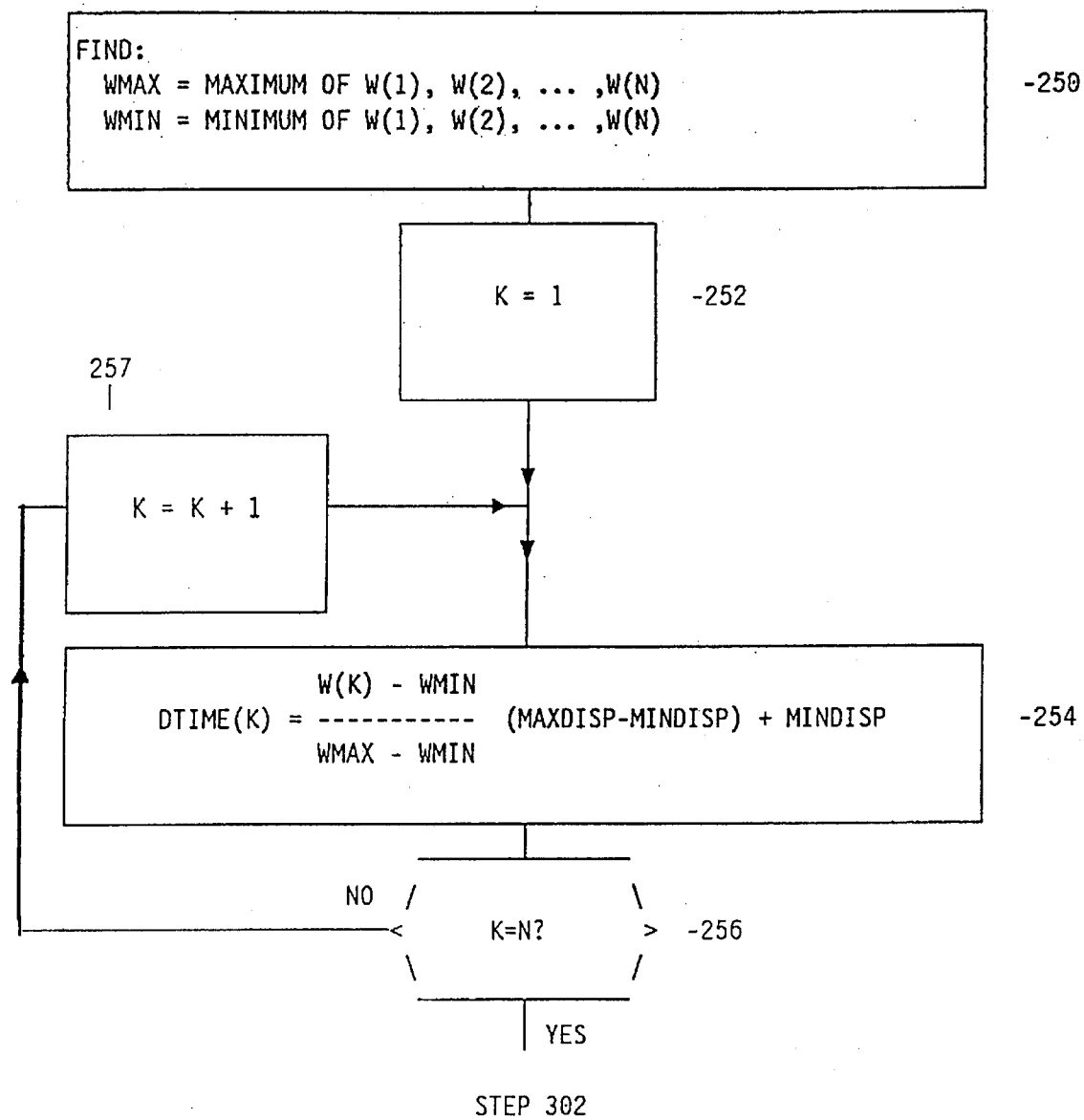
FIG. 5 is a flow chart of another embodiment of an initial portion of a display time converter program within the computer system of FIG. 1.

Step 210 of FIG. 2 is illustrated in more detail beginning with step 250 of FIG. 5 in cases where the user desires to enforce with re-scaling rather than clipping the minimum and maximum display duration limits specified in step 100. In step 250, the converter program determines the maximum and minimum weights of all the images. Then, the converter program initializes the image parameter K to one (step 252). Next, in step 254, the converter program determines the display time for the first image as ((weight of the first image)—(minimum weight)) ((specified maximum display time)—(specified minimum display time))/((maximum weight)—(minimum weight))+(specified minimum display time). Basically, the display time equals the weight, rescaled so that the image with the least weight gets the minimum display time MINDISP, and the image with the greatest weight gets the maximum display time MAXDISP. The display times corresponding to the other weights then fall between MINDISP and MAXDISP. Step 254 is repeated for all other images (decision 256 and step 257). After the display times for all images have been determined according to step 254, the converter program proceeds to step 302 of FIG. 6(a).

Figure 6:
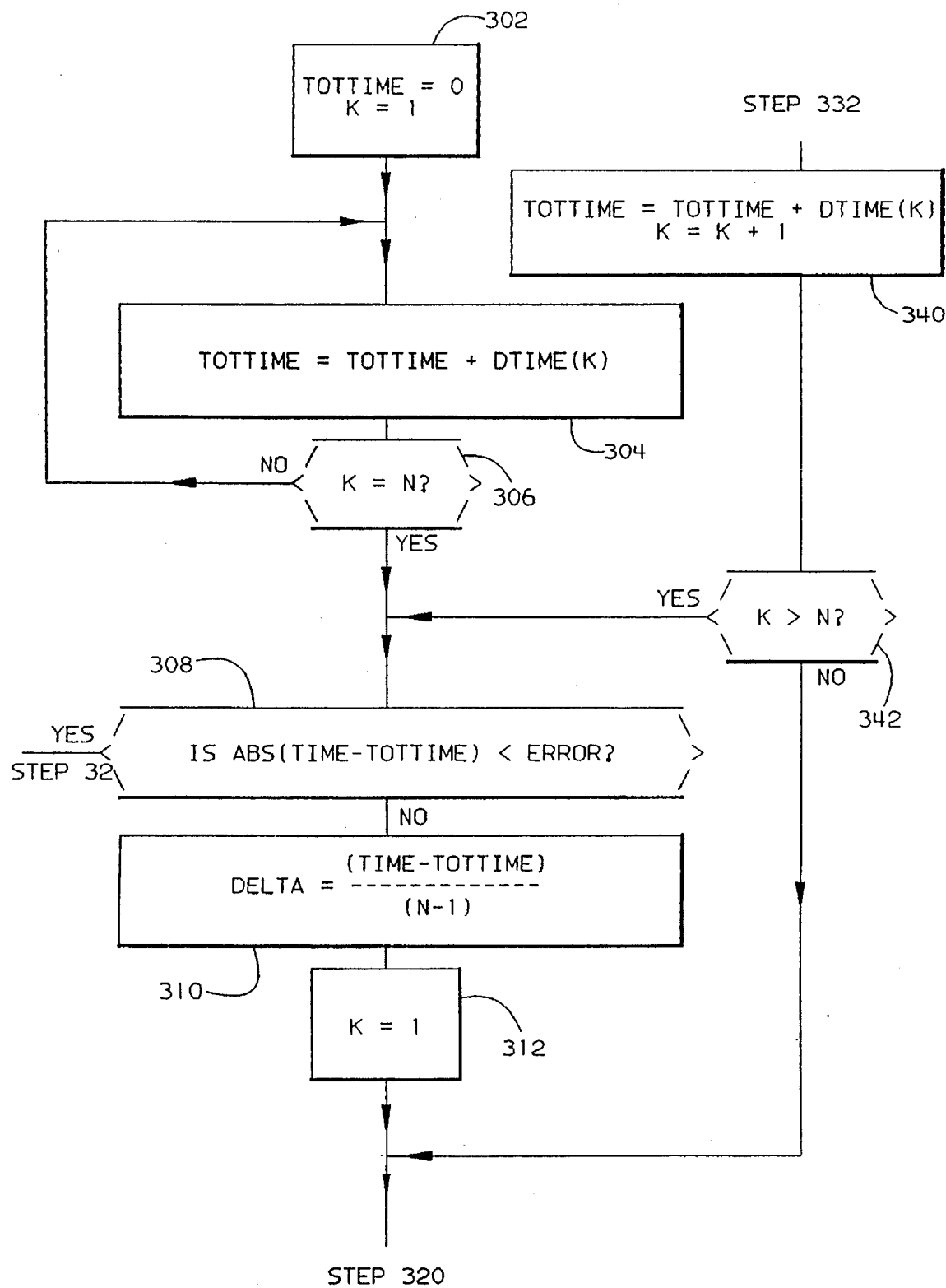
FIG. 6($a,b$) form a flow chart of a final portion of the display time converter program within the computer system of FIG. 1.
Figure 6B:
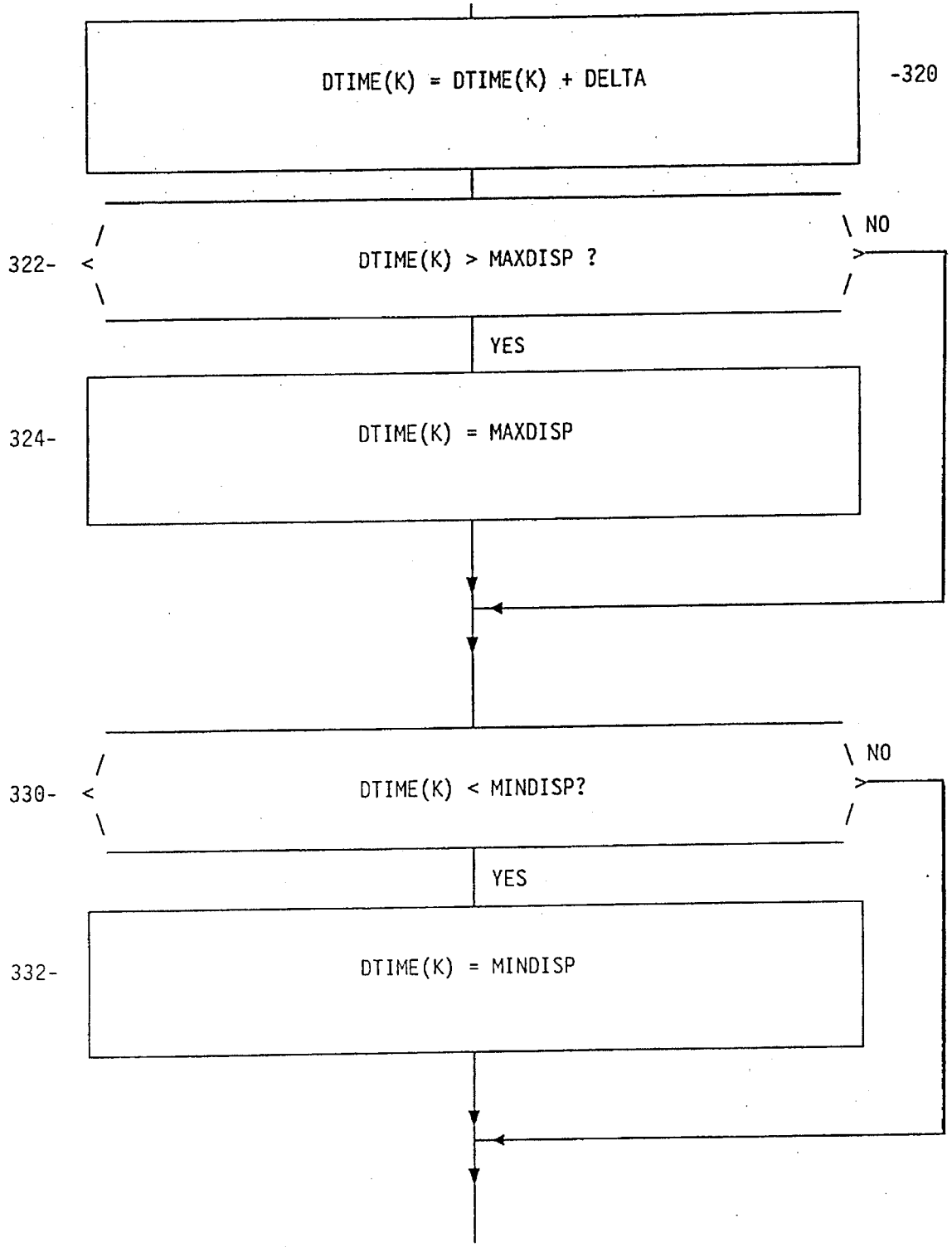

In step 302, the converter program begins a process to ensure that the sum of the display durations determined in either FIG. 4(a,b) or FIG. 5 is substantially equal to the total display time specified by the user in step 100. The process diagramed in FIG. 6 is optional—the user may not care whether the sum of the display durations equals the total display time specified. But without it, the sum of the display durations is only guaranteed to lie between N*MINDISP and N*MAXDISP. Skipping the timing adjustments done in the algorithm shown in FIG. 6 may be accomplished by setting ERROR to be very large. To begin the process, the converter program initializes a total time variable—TOTTIME to zero and the image variable K to one (step 302). Next, the converter program begins to sum the display times., determined in FIG. 4(a,b) or FIG. 5, of the images by setting the total time variable equal to the display duration determined in FIGS. 4(a,b) or 5 for the first image (step 304). Because this is not the last image in the presentation (decision 306), the converter program repeats step 304 for all other images. When completed, the total time variable equals the total display time of all the images in the video presentation as determined in FIG. 4(a,b) or FIG. 5. Then, the converter program determines if the total presentation time determined in the multiple iterations of step 304 is close enough to the specified total presentation time, i.e. a difference less than the user specified ERROR paramenter (decision 308). If so, then the converter program has completed its display time calculations and passes the display times and control to the video controller. However, if the actual total display time is not close enough to the specified total display time, then the converter program determines a display time adjustment—DELTA which equals the difference divided by the total number of images minus one (step 310). The adjustment—DELTA can be positive or negative. Then, the converter program re-initializes the image parameter K (step 312) and sets the display duration for the first image equal to that of the first image determined in FIGS. 4(a,b) or 5 plus DELTA (step 320). Next, the histogram routine determines if the result is greater than the specified maximum display time—MAXDISP (decision 322), and if so, reduces the result to the specified maximum display time (step 324). After step 324 or if the result was not greater than the specified maximum display time, the converter program determines if the adjusted display time for the first image is less than the specified minimum display time (decision 330), and if so increases the current display time for the first image to the specified minimum display time (step 332). After step 332 or if the display time exigent just before step 330 was not less than the minimum specified display time, then the converter program jumps to step 340 of FIG. 6(a) to begin to sum the total display time by setting the total display time—TOTTIME variable equal to the current display time of the first image. Because the current image is not the last in the presentation (decision 342), the histogram routine repeats steps 320–342 for the remaining images. The result is that each of the display times determined in FIGS. 4(a,b) or 5 has been increased or each has been decreased as necessary to make the total actual display time better approximate the user specified total display time.

However, because the specified maximum and minimum display times are enforced in steps 320–332, the first N iterations of steps 308–342 (for all N images) may not be sufficient to cause the total actual display time to approximate the specified total display time with sufficient accuracy as revealed in decision 308. In such a case, decision 308 will lead to steps 310 and 312, and another N iterations of steps 320–342 (for all N images). Additional sets of N iterations of steps 320–342 with the intervening adjustment of DELTA at step 310, may be required until the total actual display time approximates the specified total display time within the specified error.

Figure 7:
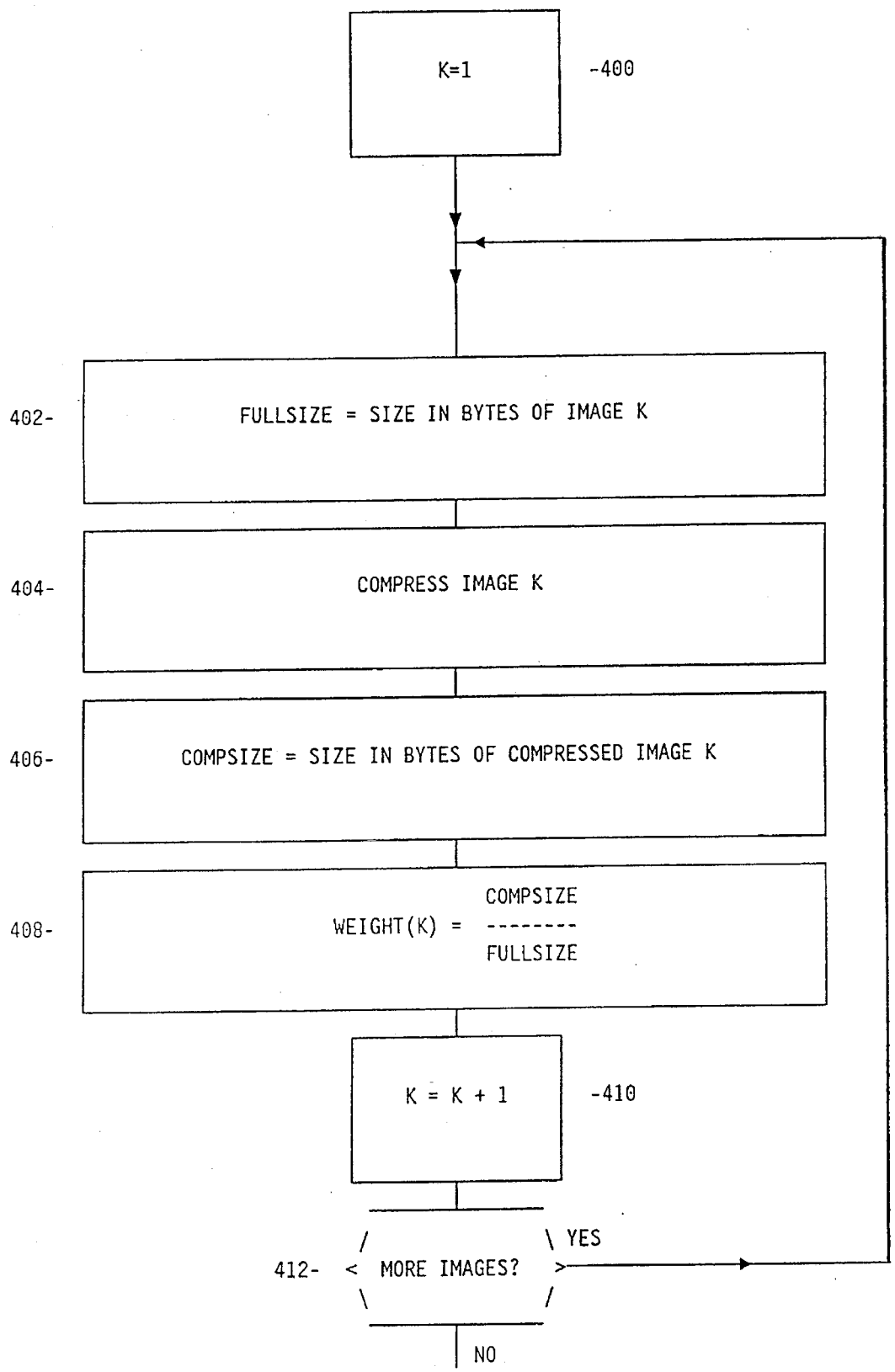
FIG. 7 is a flow chart of another specific image analyzer program within the image analyzer program shell of FIG. 2.

FIG. 7 illustrates in detail another embodiment of the image analyzer program 24, called a "compression analysis" routine. In general terms, the compression routine determines the amount of information in an image by compressing the digitized image and then determining the size of the resultant file. The greater the size, the greater the information content of the image and vice versa. The compression analysis routine is especially useful for pictorial images and also useful, but to a lesser degree, for graphic and alphanumeric images. First, the compression routine initializes a parameter "K" to represent the first image (step 400). Next, the compression routine determines the number of bytes of the first image before compression by subtracting the beginning address of the file storing the uncompressed image from the end address of the file (step 402). Next, the compression routine performs a digital compression of the first image (step 404). There are a variety of known compression techniques that will suffice. The preferred compression technique is Huffman Coding, a lossless compression method. Huffman coding is implemented by first getting an approximately decorrelated representation of the image by some method such as pixel-to-pixel differencing, then assigning code words of various lengths to all the possible values obtainable. The assignment of code words is done in such a way as to minimize the entropy of the resulting code words. This is accomplished by treating the frequency of each possible value in the decorrelated representation as a probability and building a tree successively combining the lowest two probabilities until all are combined. Then the code words are derived by working backwards within the tree, assigning 1 to each left branch and 0 to each right branch (or vice versa) to find the code word for each leaf. Huffman coding is described in detail in chapter 5 of Digital Picture *Processing, 2nd edition*, Volume 1, by Rosenfeld, Azriel and Avinash, C. Kak, Academic Press, Inc., Orlando, Fla., 1982, which is hereby expressly incorporated by reference as part of the present disclosure. Next, the compression analysis routine determines the number of bytes of the compressed image by subtracting the beginning address of the file storing the compressed image from the end address of the file (step 406). Next, the compression analysis routine determines the image weight as the ratio of the compressed size to the uncompressed size (step 408). Next, the compression analysis routine increments the image parameter K (step 410), and assuming there are other images in the presentation (decision 412), loops back to step 402 to perform the same analysis for the second image. After the weights of all the images in the presentation are determined according to multiple iterations of steps 402–408, the compression analysis routine returns to step 200 of FIG. 2. Then, the image analyzer 24 completes steps 204–200 as described above and then proceeds to the display time converter 30 as described above.

Figure 8:
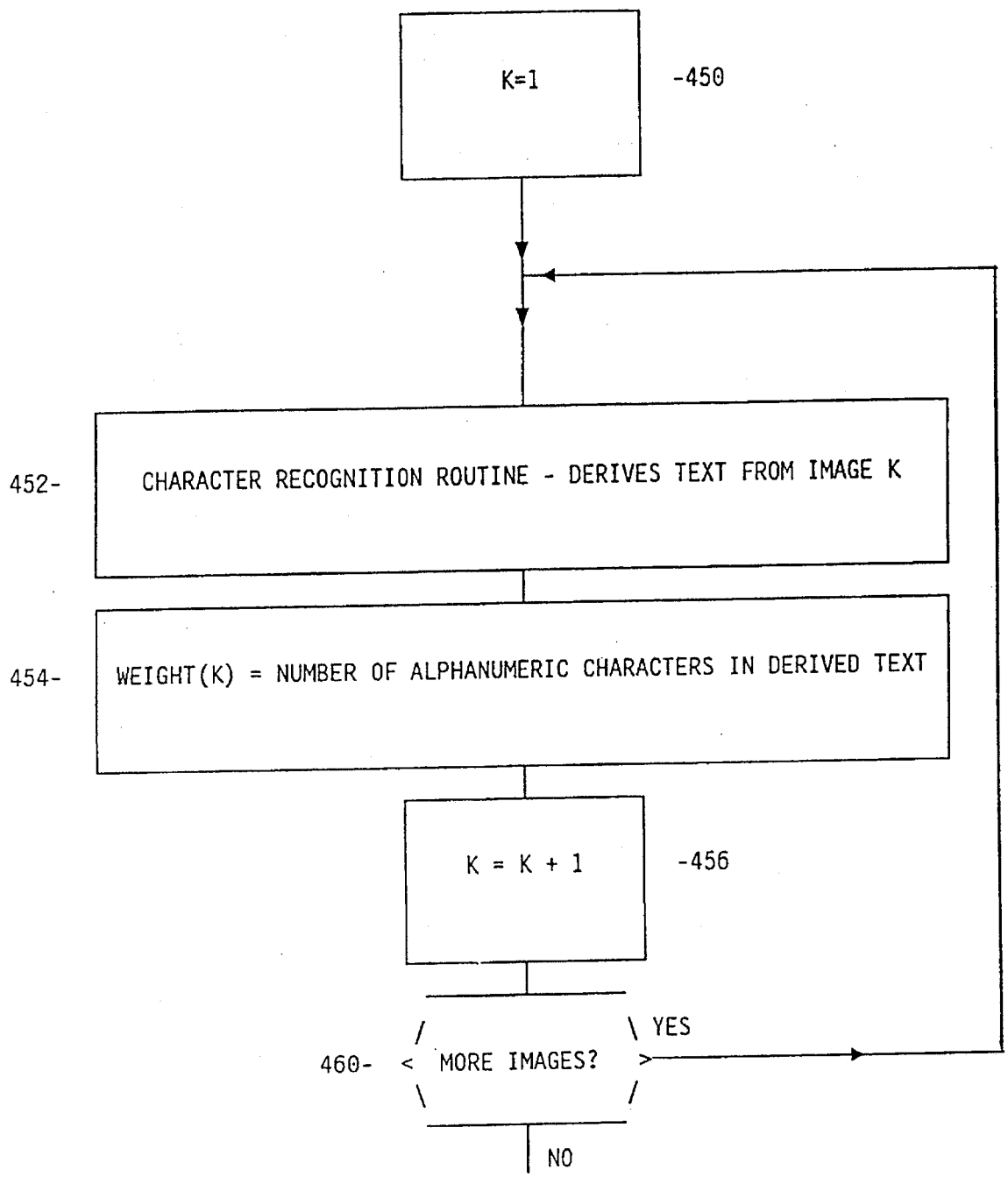
FIG. 8 is a flow chart of another specific image analyzer program within the image analyzer program shell of FIG. 2.

FIG. 8 illustrates in detail another embodiment of the image analyzer program 24, called a "character recognition analysis" routine. In general terms, the character recognition routine determines the amount of information in an image by counting the number of alphanumeric characters in the digitized image. The weight is proportional to the number of characters. The character recognition routine is useful for images of alphanumeric text and data. First, the character recognition routine initializes a parameter "K" to represent the first image (step 450). Next, the character recognition routine determines the number of alphanumeric characters in the first image (step 452). There are a variety of known techniques for recognizing alphanumeric characters. For example, that disclosed in U.S. Pat. No. 5,303,311 by Epting, et al. which patent is hereby incorporated by reference as part of the present disclosure. After recognizing the characters, the character recognition routine counts them and sets the weight for the image equal to the count (step 454). Next, the character recognition routine increments the image parameter K (step 456), and assuming there are more images in the presentation (decision 460), repeats steps 452 and 454 for the second image. Steps 452–460 are repeated for all images in the presentation, and then the character recognition routine returns to step 200 of FIG. 2. Then, the image analyzer 24 completes steps 204–200 as described above and then proceeds to the display time converter 30 as described above.

Figure 9:
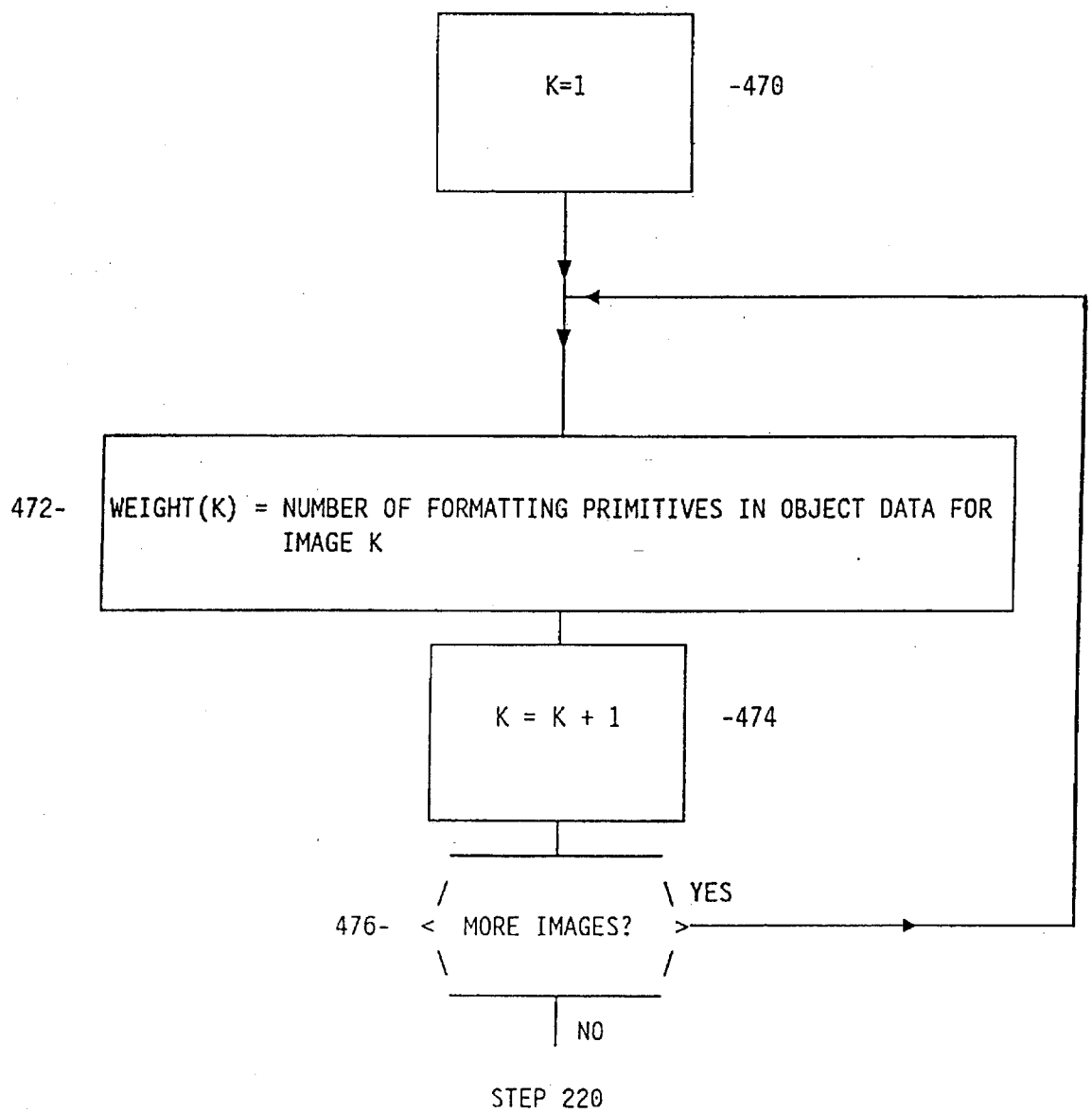
FIG. 9 is a flow chart of another specific image analyzer program within the image analyzer program shell of FIG. 2.

FIG. 9 illustrates in detail another embodiment of the image analyzer program 24, called a "graphic primitive recognition analyzer" routine. In general terms, the graphic primitive recognition routine determines the amount of information in an image by counting the number of graphic primitives, i.e. alphanumeric characters and predetermined symbols, shapes and geometric configurations in the digitized image. The weight is proportional to the number of graphic primitives. The graphic primitive recognition routine is useful for images of alphanumeric text and data and predetermined symbols, shapes and geometric configurations. First, the character recognition routine initializes a parameter "K" to represent the first image (step 470). Next, the character recognition routine determines the number of graphic primitives in the first image (step 472). There are a variety of known techniques for recognizing the graphic primitives. For example, use the unformatted object data for the image and count the number of alphanumeric characters to be formatted and the number of formatting control words. After recognizing the graphic primitives, the primitive recognition routine counts them and sets the weight for the image equal to the count (step 472). Next, the graphic primitive recognition routine, increments the image parameter K (step 474), and assuming there are more images in the presentation (decision 476), repeats steps 472 thru 476 for the second image. Steps 472–476 are repeated for all images in the presentation, and then the graphic primitive recognition routine returns to step 200 of FIG. 2. Then, the image analyzer 24 completes steps 204–200 as described above and then proceeds to the display time converter 30 as described above.

Based on the foregoing, a computer system for determining display times of video images has been disclosed. However, numerous modifications and substitutions can be made without deviating from the scope of the present invention. For example, rather than using a lossless compression scheme as used in FIG. 7 and obtaining the image weights based on the ratio of compressed to uncompressed sizes a lossy compression scheme such as the discrete cosine transform-based method described in U.S. Pat. No. 4,780,761 by Daly et al. can be used. The weightings could be chosen to be inversely proportional to some measure, such as mean square error, of the difference between the original and the compressed/decompressed version of each image.

An example of a modification is to include defined weightings for different types of graphic primitives when using the method in FIG. 9. For instance, each formatting command could be counted the same as forty-seven characters. Therefore, the present invention has been disclosed by way of illustration and not limitation and reference should be made to the following claims to determine the scope of the present invention.

We claim:

1. A system for determining display durations of each of a plurality of images in a presentation, said system comprising:

means for determining an information content of each of said images; and means for determining for each of said images a display duration based on a respective amount of the information content in the image; and wherein the display duration determining means enforces a minimum and maximum limit for the display duration of each of said images.

2. A system as set forth in claim 1 further comprising means for receiving specification of a total presentation time for all of said images and wherein the display duration determining means determines the display durations of each of said images based on the information content of the respective image, said minimum and maximum limit and said total presentation time.

3. A system for determining display durations of each of a plurality of images in a presentation, said system comprising:

means for determining an information content of each of said images;

means for determining for each of said images a display duration based on a respective amount of the information content in the image; and means for receiving specification of a total presentation time for all of said images and wherein the display duration determining means determines the display durations of each of said images based on the information content of the respective image and said total presentation time.

4. A system for determining display durations of each of a plurality of images in a presentation, said system comprising:

means for determining an information content of each of said images; and means for determining for each of said images a display duration based on a respective amount of the information content in the image; and wherein the display time determining means determines for each image the number of pixels at each of a multiplicity of respective pixel levels, and determines the total number of pixels at one or more pixel levels for which the respective number(s) of pixels are significantly larger than the numbers of pixels at other pixel levels.

5. A system as set forth in claim 4 wherein the display time determining means determines the information content of each image based on the total number of pixels at said other pixel levels such that the total number of pixels at said one or more pixel levels are considered as having relatively little information content.

6. A system for determining display durations of each of a plurality of images in a presentation, said system comprising:

means for determining an information content of each of said images; and means for determining for each of said images a display duration based on a respective amount of the information content in the image; and wherein the display time determining means determines for each image the number of pixels at each of a multiplicity of pixel levels, determines an order of pixel values based on descending order of the numbers of respective pixels at said pixel values, and determines the pixel value whose count is less than the count of the preceding pixel value by at least a predetermined amount.

7. A system as set forth in claim 6 wherein the display time determining means determines information content based on a number of pixels represented by pixel values after said preceding pixel value.

8. A method for determining display durations of each of a plurality of images in a presentation, said method comprising the steps of:

determining an information content of each of said images; and determining for each of said images a display duration based on a respective amount of the information content in the image; and wherein the display duration determining step enforces a minimum and maximum limit for the display duration of each of said images.

9. A method as set forth in claim 8 further comprising the step of receiving specification of a total presentation time for all of said images and wherein the display duration determining step determines the display durations of each of said images based on the information content of the respective image, said minimum and maximum limit and said total presentation time.

10. A method for determining display durations of each of a plurality of images in a presentation, said method comprising the steps of:

determining an information content of each of said images;

determining for each of said images a display duration based on a respective amount of the information content in the image; and receiving specification of a total presentation time for all of said images and wherein the display duration determining step determines the display durations of each of said images based on the information content of the respective image and said total presentation time.

11. A method for determining display durations of each of a plurality of images in a presentation, said method comprising the steps of:

determining an information content of each of said images; and determining for each of said images a display duration based on a respective amount of the information content in the image; and wherein the display time determining step determines for each image the number of pixels at each of a multiplicity of respective pixel levels, determines the total number of pixels at one or more pixel levels for which the respective number(s) of pixels are significantly larger than the numbers of pixels at other pixel levels.

12. A method as set forth in claim 11 wherein the display time determining step determines the information content of each image based on the total number of pixels at said other pixel levels such that the total number of pixels at said one or more pixel levels are considered as having relatively little information content.

13. A method for determining display durations of each of a plurality of images in a presentation, said method comprising the steps of:

determining an information content of each of said images; and determining for each of said images a display duration based on a respective amount of the information content in the image; and wherein the display time determining step determines for each image the number of pixels at each of a multiplicity of pixel levels, determines an order of pixel values based on descending order of the numbers of respective pixels at said pixel values, and determines the pixel value whose count is less than the count of the preceding pixel value by a predetermined amount.

14. A method as set forth in claim 13 wherein the display time determining step determines information content based on a number of pixels represented by pixels values after said preceding pixel value.

* * * * *